(12) United States Patent
Gebhard et al.

(10) Patent No.: US 6,750,050 B2
(45) Date of Patent: Jun. 15, 2004

(54) POROUS NON-FRIABLE POLYMER FILM

(75) Inventors: Matthew S. Gebhard, New Britain, PA (US); Patricia M. Lesko, Ottsville, PA (US); Albert B. Brown, Buckingham, PA (US); David H. Young, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/965,377

(22) Filed: Sep. 27, 2001

(65) Prior Publication Data

US 2002/0071867 A1 Jun. 13, 2002

Related U.S. Application Data

(60) Provisional application No. 60/241,603, filed on Oct. 19, 2000.

(51) Int. Cl.[7] .................. C12N 11/08; C12N 11/04; B23B 9/04; C08F 2/00
(52) U.S. Cl. ................. 435/180; 428/411.1; 435/182; 435/395; 523/201; 525/902
(58) Field of Search ................ 435/174, 177, 435/180, 182, 395; 428/411.1; 523/201; 525/902

(56) References Cited

U.S. PATENT DOCUMENTS

| | | | | |
|---|---|---|---|---|
| 4,791,151 A | * | 12/1988 | Kowalski et al. | 523/201 |
| 5,147,937 A | * | 9/1992 | Frazza et al. | 525/243 |
| 5,308,890 A | * | 5/1994 | Snyder | 523/201 |

FOREIGN PATENT DOCUMENTS

| | | |
|---|---|---|
| EP | 0 288 203 B1 | 4/1988 |
| EP | 0711 199 B1 | 7/1994 |

OTHER PUBLICATIONS

Journal of Membrane Science 155 (1999), "Porous latex composite membranes: fabrication and properties", Steven Jons, Paul Ries, Charles J. McDonald, pp. 79–99.

Biotechnology and Bioengineering, vol. 62, No. 1, Jan. 5, 1999; "A Patch Coating Method for Preparing Biocatalytic Films of *Escherichia coli*", pp. 44–55.

* cited by examiner

*Primary Examiner*—David M. Naff
(74) *Attorney, Agent, or Firm*—Stephen E. Johnson; Witold Andrew Ziarno

(57) ABSTRACT

Porous films are provided which include a blend of a film forming polymer and a non-film forming material, the film having a network of pores or channels throughout the film. The porous polymer films are formed between 0° and 80° C. retain porosity at elevated temperatures and are non-friable. A process for preparing porous polymer films and their applications are disclosed.

5 Claims, No Drawings

POROUS NON-FRIABLE POLYMER FILM

CROSS REFERENCE TO RELATED PATENT APPLICATIONS

This is a non-provisional application of prior pending U.S. provisional application serial No. 60/241,603 filed Oct. 19, 2000.

BACKGROUND OF THE INVENTION

1. Field of the Invention

The present invention relates to the production of porous non-friable films from emulsion polymers, porous films formed at ambient temperature and processes of manufacturing films having permanent porosity.

2. Description of the Related Art

It is well known that latex films containing particles that are well ordered prior to the final stage of film formation exhibit the best barrier properties. When latex films are used as binders, the same barrier properties can be a disadvantage where access to reactive or adsorptive sites is required. Therefore, latex films having porous structures or transport pores are desirable would have utility in chemical and biochemical processes, such as those that utilize liquid barrier technology, breathable coatings, supported catalysts, sensor technology, encapsulated biocides, immobilized bacteria technology or immobilized cell technology.

A number of different techniques have been employed to create porous films by deliberate reductions in latex stability prior to film formation and by exceeding critical pigment volume fractions, the latter involves adding excess pigment or filler so that there is enough binder to glue the particles together yet not enough to completely fill interstitial voids, but each technique has serious drawbacks, namely, the inability to control and retain a pore structure in the film.

Compositions derived from an intimate mixture of an aqueous latex of a film forming or coating polymer and the cells of an organism have been disclosed in a European publication, EP 0 288,203 B1. The polymer has sufficient fluidity to undergo at least partial coalescence and a process for the production of an enzyme reaction product, formed by mixing the polymer, bacterial cells and a flocculant, causing the cells and the polymer to agglomerate. One important aspect of the process disclosed is the use of polymer flocculation to produce the porous polymer/bacteria agglomerates. This aspect limits the general utility of the process by requiring a second ingredient be added or some other trigger be used at the point of creating the porous agglomerates. A second aspect of this disclosure is the need to anneal the latex particles at a temperature above the Tg of the polymer. If the operating temperature of the porous agglomerates is at or above room temperature then the latex particle must be annealed substantially above room temperature. If the particles could be annealed at room temperature then the porous agglomerates would quickly lose porosity at room temperature. Another important limitation of the disclosure in EP 0 288,203 B1 is the inability of the porous agglomerates to function at high operating temperatures (T~80° C.), due to continued particle coalescence. Polymers having relatively high Tg (>80° C.) in such a process, however, would require annealing at temperatures well above 80° C. to achieve sufficient fluidity, a condition which would be detrimental to the bacteria or other organisms. The additional requirement of relatively high operating temperatures has become more important as bio-processing technology has focused on thermophilic bacteria, which are capable of surviving at 80° C. for extended periods of time. It is clear that a process for forming smooth, porous films at ambient temperature, which are a capable of withstanding high operating temperatures without the concomitant loss of porosity is highly desirable, yet is not possible given the disclosure of EP 0 288,203 B1.

Another process for preparing porous composite membranes for ultrafiltration and micro-filtration membranes has been disclosed in European publication, EP 0 711,199 B1. The membranes are prepared by depositing discrete, spherical, polymeric particles, obtained by suspension, dispersion or emulsion polymerization on the surface of a porous substrate to obtain the composite and using thermal coalescence of the particles or chemical means to stabilize the resulting composite. A key limitation of the disclosure in EP 0 711,199 B1 is the need to thermally coalesce the latex particles at relatively high temperatures (>120° C.). There are many applications, including bacteria/latex composite films, in which the high annealing temperature is not practical. A number of typical processing and performance limitations associated with this membrane technology, such as the restricted choices of available pore sizes, has been detailed in a publication of Jons, Ries and McDonald in the Journal of Membrane Science, Vol. 155, pages 79–99 (1999). Thus, an enabling process to form porous films comprising latex particles at ambient temperature would indeed have significant utility.

Current aqueous latex polymer technology utilizes the process of latex film formation to afford continuous, non-porous films. In a number of important chemical and bio-chemical processes, however, polymer films that retain a high degree of porosity so as to allow small molecules to diffuse, relatively unhindered, in and out of the film are of great commercial utility. It is also desirable in such applications that film formation be accomplished at or close to ambient temperature and the resulting porous film not be friable after film formation is complete. A long recognized problem has been to make a permanently porous film from water-borne latex dispersion polymers, such that film formation occurs at ambient temperature and the resulting film once formed is not friable, possesses a high degree of porosity and retains porosity at elevated temperatures for long periods of time. Currently aqueous latex technology either affords films with no porosity, partially coalesced films that are non-uniform and have stability issues, films with high porosity which require elevated temperature for film formation, or films having high porosity which require polymer flocculation to create the porous structure.

SUMMARY OF THE INVENTION

Inventors have discovered a process to create permanent porosity in polymeric films. By employing such a process, inventors have produced porous polymer films at ambient temperatures, polymer films that have a permanent pore structure and polymer films that retain porosity at elevated temperatures. The present invention discloses three aspects to solving the current problem of producing permanently porous polymer films. The first aspect involves blending a non-film forming material in particulate form and film forming latex polymer particles having diameters small enough to fit through the interstices formed from the non-film forming particle matrix. The second aspect involves using a core-shell latex polymer such that the inner core of the polymer particle is a non-film forming polymer and the shell is a film forming polymer particle. The third aspect involves using large dimension, emulsion polymer particles. The present invention also contemplates using blends of all polymer types disclosed in the above mentioned aspects of the invention. The porous polymer films of the present invention provide improved adsorbent performance and the potential for sustained release of reaction products from entrapped organisms or immobilized cells.

DETAILED DESCRIPTION OF THE INVENTION

According to the first aspect of the invention there is provided a porous film comprising a blend of (a) at least one non-film forming material and (b) at least one film forming polymer, the film having a network of pores or channels throughout the film, wherein the film forming polymer is present in the blend from between 5 and 35%, based on the total volume of polymer and the film is non-friable.

According to the second aspect of the invention there is provided a porous film comprising a water-borne latex dispersion of a multi-stage polymer having at least one non-film forming material and at least one film forming polymer, the porous film maintains porosity up to 160° C., wherein the film forming polymer has a Tg no greater than 20° C., the non-film forming material is a polymer having a Tg of at least 30° C., wherein the film forming polymer is present in the blend from between 5 and 35%, based on the total volume and the film is non-friable.

According to all aspects of the invention there is provided a process for producing porous films comprising the steps of depositing a composition of the first three aspects of the invention alone or in combination in a liquid state on a substrate and evaporating a carrier medium below 100° C.

The porous films usefully employed in accordance with the invention retain porosity after film formation and are essentially non-friable. The present invention additionally provides porous polymer films, whereby film formation occurs between 0° and 80° C. and porous polymer films that retain porosity up to 160° C.

The present invention provides a general process for the production of porous films between 0° and 80° C., porous films that retain porosity after film formation, and porous films that are non-friable. The present invention also provides a process for preparing porous films that maintain porosity at elevated temperatures. In a specific application of the process, the porous film entraps chemical compositions or biological species. The process provides thin films that are smooth and uniform, and formed using traditional coating techniques.

The present invention provides porous polymeric films having a distribution of open pores ranging from at least 1 nm to 5 µm in diameter. The invention provides porous, polymeric films that are amenable to use in fluidized bed reactors, packed bed reactors, spiral wound flow through reactors, or plate and frame flow through reactors. The invention contemplates a porous polymeric biological-support which is inexpensive and easily processed. Biocatalytic films containing immobilized organisms and cells can be prepared according to any aspects of the present invention. Polymer films prepared according to the present invention have and retain porosity in the dry state. The number and distribution of pores retained depend on a number of film processing variables, such as drying and casting.

A "porous film" herein is defined as a polymer film having a network of pores or channels throughout the film. Porosity refers to an open pore structure throughout the film. The network of pores may be continuous and has desirable transport properties.

A "film forming" polymer herein is defined as a polymer having a glass transition temperature less than 20° C., preferably less than −10° C., as measured by differential scanning calorimetry (DSC), most preferably below −20° C. By virtue of the low glass transition temperature, films prepared from such polymer particles typically will not form porous films when film formation occurs at temperatures greater than 20° C.

A "non-film forming material" herein is a polymeric or an inorganic composition.

A "non-film forming polymer" herein is defined as a polymer having a glass transition temperature greater than 20° C., and preferably greater than 80° C., and more preferably greater than 100° C., as measured by differential scanning calorimetry (DSC).

Inorganic compositions refer to any inorganic solids, namely, silicates, alumino-silicates, metal carbonates such as calcium carbonate, or metal oxides such as zinc oxide, or titanium dioxide, preferably in the form of solid particles.

Polymeric compositions refer to compositions formed as polymerization products of organic monomers, preferably in the form of emulsion polymer particles, large dimension emulsion polymer particles, macroreticular resins, or colloidal particles.

Film formation herein is defined as the process of evaporation of a liquid carrier (which may or may not be a solvent) from a fluid suspension of particles resulting in a transition from a fluid suspension of particles to a solid film.

A "non-friable film" herein is defined as a film which resists abrasion. The friability of a film is determined using a simple finger abrasion test, involving rubbing the film with a finger and examining for evidence of mechanical deterioration.

A "waterborne latex composition" herein is defined as a latex composition containing a medium that evaporates on drying which is predominantly water, yet may contain a water-miscible solvent such as, for example, alcohols, ethylene glycol ethers, and propylene glycol ethers. Preferably, the porous films are prepared from compositions containing water-borne, dispersion polymer particles.

Large dimension particles herein are defined as water-borne latex polymer compositions which have an aspect ratio greater than 1. Such compositions are referred to as rods and filaments.

Porous films of the present invention are prepared from compositions containing a blend of non-film forming materials and film forming polymer particles, such that the volume fraction of film forming polymer is between 5% and 35% based upon the total volume of the solids. The diameter of the film forming particles should be 20% or less in size than the largest dimension of the non-film forming material. It is preferred but not required that the non-film forming material is a water-borne latex polymer composition.

A porous film of the present invention is also prepared from polymer particles made by sequential polymerization techniques such that the dispersion polymer particle contains a non-film forming material and a film forming polymer, wherein the film forming polymer is between 5% and 35% based on the total volume of the particle. It is preferred that the non-film forming material is a water-borne latex polymer composition.

A porous film is prepared as well, in accordance with the present invention, from non-spherical, (i.e. rods and filaments) non-film forming emulsion polymer particles. Optionally, a film forming polymer may be added to the composition to help stabilize the resulting polymer film.

In addition, porous films of the present invention are prepared from blends of any or all of the compositions described above.

Polymer particles can be prepared from free radical addition polymerization or condensation polymerization. In a preferred embodiment, the film forming and non-film forming polymer particles are prepared using techniques well known in the art to prepare dispersion, suspension or emulsion-polymerized addition polymers. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, ammonium and/or alkali persulfates, typically at a level of 0.05% to 3.0% by weight, based on the weight of total monomer. Redox systems using the same initiators coupled with a suitable reductant such as, for example, isoascorbic acid and sodium bisulfite may be used at similar levels.

The average particle diameter of the polymer particles which can be usefully employed in accordance with the invention ranges from 20 nanometers to 10000 nanometers. The diameter of the polymer particles may be controlled by the amount of conventional surfactants added during the polymerization process. It is known in the art that by increasing the amount of surfactant added during polymerization, the diameter of the polymer particles can be reduced and by reducing the amount of surfactant, one can increase the diameter of the polymer particles. Particle sizes from 20 to 10000 nanometers are achieved by adding from 6% to 0.1% surfactant by weight, based on the weight of total monomer, respectively. Conventional surfactants include anionic, nonionic emulsifiers or their combination. Typical anionic emulsifiers include alkali or ammonium alkyl sulfates, alkyl sulfonic acids, and fatty acids. Typical non-ionic emulsifiers include polyoxyethylated alkyl phenols, alkyl phenol ethoxylates, polyoxyethylated straight-chain alcohol, amine polyglycol condensate, modified polyethoxy adducts, polyoxyethylated mercaptans, long chain carboxylic acid esters, modified terminated alkylaryl ether, and alkyl polyether alcohols.

Methods for preparing large uniform non-film forming single or multi-stage polymers (between 1000 nm and 10000 nm) are disclosed patent U.S. Pat. No. 5,147,937 and can be usefully employed in accordance with the invention.

The addition polymer particles are preferably copolymers of at least one ethylenically unsaturated monomer, such as, for example, acrylic ester monomers including methyl acrylate, ethyl acrylate, butyl acrylate, 2-ethylhexyl acrylate, decyl acrylate, methyl methacrylate, butyl methacrylate, lauryl (meth)acrylate, isobornyl (meth)acrylate, isodecyl (meth)acrylate, oleyl (meth)acrylate, palmityl (meth) acrylate, stearyl (meth)acrylate, hydroxyethyl (meth) acrylate, and hydroxypropyl (meth)acrylate; acrylamide or substituted acryl amides; styrene or substituted styrenes; butadiene; ethylene; vinyl acetate or other vinyl esters; vinyl monomers, such as, for example, vinyl chloride, vinylidene chloride, N-vinyl pyrrolidone; amino monomers, such as, for example, N,N'-dimethylamino (meth)acrylate; and acrylonitrile or methacrylonitrile. Additionally, copolymerizable ethylenically-unsaturated acid monomers in the range of, for example, 0.1% to 10%, by weight based on the weight of the emulsion-polymerized polymer, acrylic acid, methacrylic acid, crotonic acid, itaconic acid, fumaric acid, maleic acid, mono methyl itaconate, mono methyl fumarate, monobutyl fumarate, maleic anhydride, 2-acrylamido-2-methyl-1-propanesulfonic acid, sodium vinyl sulfonate, and phosphoethyl methacrylate, may be used.

Chain transfer agents, such as, for example, mercaptans may be used in an amount effective to provide a GPC weight average molecular weight of 10,000 to 1000,000. "GPC weight average molecular weight" means the weight average molecular weight determined by gel permeation chromatography (GPC) described on page 4, Chapter 1 of The Characterization of Polymers published by Rohm and Haas Company, Philadelphia, Pa. in 1976, utilizing polymethyl methacrylate as the standard.

With regard to the first aspect of the invention, the non-film forming material may be a hollow polymer particle prepared as described in U.S. Pat. No. 4,427,836. By making the non-film forming polymer hollow, a significant reduction in film density can be achieved. The non-film forming material may include a polymer shell as an encapsulant for another material such as a biocide, a pharmaceutical compound, a nutrient for living organisms, a herbicide, a plant growth regulator, a fungicide, an anti-mildew agent, a fragrance, camphor, sanitizers, skin conditioner oils, UV screens, insecticides, insect repellents, or air fresheners. Methods for making such particles are disclosed in U.S. Pat. No. 5,972,363.

In another aspect of the invention, the film forming or non-film forming polymer particles can be prepared using techniques well known in the art to prepare dispersed condensation polymers. The processes often involve the synthesis of a polymer or pre-polymer in an organic solvent or polymer melt, with subsequent inversion into water with potential chain extension occurring after inversion. Preferred are polyurethane dispersion polymers. These polyurethane dispersion (PUD) compositions are desirable due to their advantageous properties such as good chemical resistance, abrasion-resistance, toughness, elasticity and durability. A typical waterborne PUD is a poly (urethane-urea) which contains both urethane and urea groups.

The polyurethane polymer particles are made by the well known reaction between polyols and polyisocyanates to give isocyanate terminated pre-polymers. These pre-polymers are then dispersed into an aqueous medium. Diamine and triamines are often added to the aqueous dispersion of the pre-polymer to react with the remaining isocyanate groups for increasing the molecular weight of the polymer particles and for incorporating more urea groups in the polymer chain. After dispersion the remaining isocyanate groups in the pre-polymer can also react with water to yield an amine. These amines will also react with isocyanate groups to chain extend the pre-polymer. The polyols used to prepare PUDs can be either linear or branched polyethers, polyesters, or polycarbonate polyols. Low molecular weight diols and triols are often used in conjunction with the higher molecular weight polyols to adjust the amount of urethane content and branching in the PUD. The low molecular weight polyols can also contain acid (for example carboxyl or sulfonic acid) groups or amine groups which can aid in the dispersion and stabilization of the PUD. The polyisocyanate can be any aliphatic, cycloaliphatic or aromatic multifunctional isocyanate. The chain extenders can be any multifunctional amine, hydrazine, multifunctional hydrazine or hydrazide. Optionally internal emulsifiers may be added to the pre-polymer for aiding in the dispersion of the pre-polymer into the aqueous medium. The internal emulsifiers include diol or diamines that contain ionic groups, such as, carboxyl or sulfonate; multifunctional isocyanates that contain these ionic groups; nonionic hydrophilic polymer segments, such as, polyoxyethylene diols; or dials and diamines that contain these nonionic hydrophilic polymer segments.

Polyurethane particle size can be controlled during the dispersion stage by a combination of shear forces generated during the dispersion stage, viscosity of the pre-polymer, the temperature of the aqueous dispersing medium and acid or amine groups and internal emulsifiers in the pre-polymer. The particle size is decreased by:

1. increasing the level of acid or amine groups;
2. increasing the internal emulsifiers in the pre-polymer;
3. increasing the shear forces generated during the dispersion stage;
4. increasing the temperature of the aqueous dispersing medium; or
5. decreasing the viscosity of the prepolymer.

The particle size is increased by reversing the factors described above.

With regard to the second aspect of the present invention, the emulsion-polymerized addition polymer is prepared by a multistage emulsion addition polymerization process, in which at least two stages differing in composition are formed in sequential fashion. Such a process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the appearance of the phases, for example, is such a technique. Such particles are composed of two or more phases of various geometries such as, for example, core/shell or core/sheath particles, core/shell particles with shell phases incompletely encapsulating the core, core/shell particles with a multiplicity of cores, interpenetrating network particles and multi-lobed particles described in the commonly assigned U.S. Pat. No. 4,791,151 and are usefully employed in accordance with the invention. In all of these cases the majority of the surface area of the particle will be occupied by at least one outer phase and the interior of the particle will be occupied by at least one inner phase. The two-staged emulsion-polymerized addition polymer particles which are embodied in this invention include from 5% to 35% of a film forming polymer and from 65% to 95% of a non-film forming polymer, based on the total volume of the polymers. While the preferred morphology is presumed to have the film forming polymer on the exterior of the particle the invention is not bound by this morphological configuration. The only constraint being that the film forming polymer aid in providing porous films in accordance with the invention. In certain instances this constraint can be relaxed if the multistage particles are blended with a film forming polymer, such as described in the first embodiment. Preferred diameters of multi-staged emulsion-polymerized addition polymer particles range from 30 nanometers to 10000 nanometers.

The emulsion polymerization techniques used to prepare such dispersions are well known in the art such as, for example, U.S. Pat. Nos. 4,325,856; 4,654,397; and 4,814,373 and are usefully employed in accordance with the invention.

If desired, the composition may comprise a physical blend of particles of single or multi-stage latex copolymers and a polyurethane dispersion. The blend comprises from 0 percent to 100 percent by volume of the single or multi-stage copolymers and 100 percent to 0 percent by volume of polyurethane dispersion particles. All the weight percentages are based on the total volume of the polymer particles. In a preferred embodiment, the single or multi-staged copolymers are substantially non-film forming and range from 65% to 95% by volume. The polyurethane dispersion particles are film forming and range from 5% to 35% by volume.

The diameters of the polymer particles were measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. in 1987 edition of American Chemical Society Symposium series. To measure the particle diameter, 0.1 to 0.2 grants of a sample of acrylic polymer was diluted to a total of 40 ml with distilled water. A 2 ml portion was delivered into an acrylic cell, which was then capped. The particle size was measured for 1000 cycles. The measurement was repeated three times and an average was reported. The aqueous composition in coating (ii) may comprise at least two mutually incompatible copolymers, at least one of which is the film forming latex polymer described above.

With regard to the third aspect of the invention the non-film forming polymer can include large dimension emulsion polymer particles, which are prepared according to U.S. Pat. No. 5,369,163. The large dimension emulsion polymer particles are intended to be non-film forming materials, such that films prepared from them will retain porosity and are usefully employed in accordance with the invention. Large dimension emulsion particles suitable for the invention can be achieved by making the polymers with a Tg substantially above ambient temperature, or by adding a cross-linking agent such as allyl methacrylate, multifunctional acrylates, or divinyl benzene, at a level adequate to keep the polymer from film forming in the dry state. Additionally the large dimension emulsion polymer particles can be blended with a film forming polymers.

In accordance with all aspects of the invention, the compositions may be blended with other materials, such as those normally found in paint compositions and other coating compositions. For example, the copolymer may be blended with a polyurethane, a polyester, a polyamide, an acrylic copolymer, a styrene-acrylic copolymer, polyvinyl alcohol, hydroxyethyl cellulose, thickeners, rheology modifiers, additives, fillers, extenders, coalescing aids, platicizers, slip aids, defoamers, glycols, glycerol, biocides, colorants, pigments, or mixtures of these materials, while retaining the film forming and non-film forming properties of the original copolymer blend.

The porous latex films of the present invention can be usefully employed in the preparation of biocatalytic films of immobilized cells or organisms, such as *Escherichia coli*. A method for immobilizing viable but non-growing cell lines of *Escherichia coli* in highly uniform patches, the patches consisting of a thin layer of bacteria in acrylate/vinyl acetate copolymer covered with a thin layer of the same copolymer, devoid of bacteria and sealed at the edges, has been reported in a publication of Flickinger et al in the Journal of Biotechnology and Bioengineering, Vol. 2, pages 45–55 (1999). While the patch coating method is a substantial improvement on a previous method for making uniformly sealed immobilized cell samples, the authors report that there still exist major limitations associated with generating immobilized cell samples that are uniform in thickness and cell content. A principal limitation of the disclosed method, which involves the use of latex films, is the inability to control pore size, retarding coalescence of pores at ambient temperature and retaining permanent pores at elevated temperatures. Using a blend of a non-film forming material, for example, a latex emulsion polymer or hydroxyethylcellulose and a latex film forming polymer a porous polymer film of thickness ranging from 20 to 100 $\mu$m (wet film thickness) can be prepared that retains an open pore structure from 0° to 120° C. The porous film is drawn out over a sterilized stainless steel or polyester sheet and coated with a bacterial strain of E. coli. A permeability test is run to confirm the presence of an open pore structure in the bacteria/latex composite film. The E. coli strain is cultured, grown and studied for biocatalytic activity at 30° C. Both the permeability test and procedure for determining catalytic activity is described in the publication of Flickinger et al and is usefully employed in accordance with the present invention. The inventor's process for preparing the bacteria/latex composites has a number of advantages over the patch coat method for preparing biocatalytic films. The mechanical strength of the latex support is significantly improved without compromising viability of the bacterial strain. The porous latex coatings of the present invention retain their porosity when allowed to dry and do not coalesce at room temperature (20–25° C.). Blistering defects associated with the patch coat method are avoided. The porous films of the present invention represent a substantial improvement of methods for making uniform samples of immobilized cell/latex composites.

The compositions of the present invention may also be used in coating processes that provide films with unique functional capabilities. To have utility, the coating processes would be amenable to forming films from liquids. Coating processes include liquid spray coating, reverse or direct roller coating, brush applied coating, slot-die coating, slide coating, air-knife coating, gravure printing, flexographic printing, wire wound rod coating, or dip coating. All of these coating methods are well known in the art. Specific embodiments of processes usefully employed with the compositions of the invention include:

1. A process for preparing polymeric coatings with low density and thus low thermal and acoustic conductivity.
2. A process for preparing polymeric membranes which can be used as filters or size exclusion membranes. Optionally, the polymer compositions of the present invention possess specific chemical functionality to bind or react with other materials. The incorporation of ion exchange materials in the film exemplify such a process.
3. A process for preparing polymeric supports to hold or entrap organisms. Suitable organisms include bacteria, yeast, fungi, plant, algal and mammalian cells. The films are prepared by first mixing the compositions of the invention with the desired organism and subsequently coating this mixture on a suitable substrate using the coating methods described above. The organism containing films are then utilized in reactors to perform chemical transformations, used as environmental detectors, or used for remediation of environmental contaminants.
4. A process for preparing polymeric supports to hold or entrap chemical catalysts. The catalyst containing films are then utilized in reactors to perform chemical transformations.
5. A process for preparing polymeric supports to hold or entrap organisms in order to create viable mixed cultures. By virtue of their entrapped state, potentially incompatible organisms may be brought in to close contact with one another without adversely effecting either microorganism population. Mixed cultures containing more than one cell type, induce or enhance production of natural products which may be used in various applications. The process would be useful, for example, in screening and production of natural products that may be useful as pharmaceuticals, agricultural chemicals, and industrial chemicals, or may serve as useful intermediates for such products. The medium or extracts from such mixed cultures can provide a novel source of natural products to screen for biologically-active materials having utility in pharmaceutical, agrochemical or industrial applications. Production from cells in culture is an established means of obtaining natural products. Such cultures can be manipulated in various ways such as changing the composition of the growth medium or culture conditions in order to induce the production of a desired material or enhance the amount produced. For example, the polymeric films of the current invention are less susceptible to breakage under conditions of rapid agitation which is frequently needed to provide adequate aeration of the cultures, can be stored for longer periods of time while retaining cell viability, can be used with cells which excrete enzymes capable of degrading alginate, and can be prepared in thin films thus maximizing the efficiency with which nutrients and metabolites are exchanged with the surrounding medium. The entrapped cells may be bacterial, fungal, plant, algal, or mammalian cells, and may be tailored to a given application by prior selection for desired properties or may be genetically-modified to impart the desired properties. Examples of properties which may be desirable include the ability to produce a particular product, improved viability, stability to particular culture conditions such as extreme pH or temperature, or longevity. The mixed culture can comprise two or more organisms supplied as entrapped cells in a polymer film. The organisms may be entrapped in a single film, in different layers of a single film, or in separate films which are subsequently used in the same culture. Alternatively, the mixed culture can contain an organism growing free in a culture medium and one or more additional organisms supplied as entrapped cells in a polymer film. An advantage of supplying one or more organisms as entrapped cells in a polymer film is that the entrapped cells, although metabolically active, do not divide and therefore cannot overwhelm the other organisms in the culture by the ability to grow at a faster rate.
6. A process for preparing polymeric coatings containing encapsulated materials such as biocides; fragrances; herbicides; fungicides; plant growth regulators; insecticides; camphor; fertilizers; air freshener; hydrophobic antimicrobial active materials like triclosan, o-phenyl phenol; sanitizers; moisturizing creams; skin conditioner oils; UV screens, or insect repellents. Non-film forming polymers utilized in the composition comprise encapsulating polymers as described in U.S. Pat. No. 5,972,363. Advantages of using compositions of the present invention in such a process are improved small molecule transport properties as compared materials known in the art.
7. A process for preparing polymeric coatings containing an inorganic non film forming material, which have absorbed compounds such as biocides; fragrances; herbicides; fungicides; plant growth regulators; insecticides; camphor; fertilizers; air fresheners; hydrophobic antimicrobial active materials like triclosan, o-phenyl phenol; sanitizers; or insect repellents.

8. A process for preparing polymeric coatings which can be applied dermally wherein the film may contain active ingredients which are meant to transport through film and be delivered transdermally, such as the transdermal delivery of pharmaceutical agents. The pharmaceutical agents would be incorporated in non-film forming polymers using methods described in U.S. Pat. No. 5,972,363. By virtue of their porosity, such films have utility as a breathable patch for skin.
9. A process for preparing polymeric coatings which serve as a template matrix for the formation of inorganic materials such as metal oxides, conductive materials such as metals, or narrow sized/porous semiconductor materials, in which the porous polymer film is infused with a liquid metal-organic material, such as an organosilicon, organotin, organotitanium, organogermanium, organozirconium, metal alkoxide, or metal chloride materials. The liquid metal-organic material is allowed to solidify through known reactions with water. If desired, after solidification of the metal-organic material, the coating compositions of the invention may removed by thermal degradation or pyrolysis.
10. A process for preparing polymeric coatings which can be used for the for the separation of gases, or the separation of low boiling point liquids from solvents such as water.
11. A process for preparing porous polymeric coatings on a substrate, wherein the porous polymer coatings acts to provide anchoring sites for subsequent coating layers.
12. A process for preparing polymeric coatings which can be site applied over architectural structures or building construction materials using the above coating techniques; wherein the applied coating is substantially impervious to liquid water but by virtue of its porosity retains substantial permeability to water vapor.
13. A process for preparing polymeric coatings wherein the coatings when applied to textiles will reduce the permeability of the textile to liquid water while maintaining permeability to water vapor.
14. A process for preparing water vapor permeable polymeric coatings wherein the coatings when applied to textiles wherein the coating composition contain conductive materials such as conductive carbon black so as to act as means to reduce static.
15. A process for preparing polymeric coatings wherein the coating are applied to non-porous substrates such as photo transparencies, and the coatings make the substrate receptive to ink printing through absorption and/or specific reactions in the polymeric coating. A preferred use of the process is to make ink jet receptive substrates.
16. A printing process utilizing the compositions of the present invention as ink binders, wherein the porous compositions provide accelerated drying speeds. Printing processes comprise flexographic printing, gravure printing, ink jet printing, and laser printing.
17. A process for preparing polymeric coatings which actively defeat undesirable mildews, fungi, or bacteria; wherein the polymeric coatings contain embedded organisms which produce bio-active molecules which inhibit the growth of other microorganisms.
18. A process for preparing polymeric coatings which actively remove formaldehyde from the air in a house by a specific reaction with a component in the film. Components in the film include primary amines, hydrazides, or acetyl acetonate.
19. A process for preparing polymeric coatings which act as porous protective coatings in the manufacture of chemical sensors.
20. A process for preparing polymeric coatings applied to crops which contain an agriculturally active compound encapsulated within the non-film forming polymer.

Some embodiments of the present invention will now be described in detail in the following examples.

EXAMPLES

The abbreviations listed below are used throughout the examples.

BA=Butyl Acrylate

MMA=Methyl Methacrylate

MAA=Methacrylic Acid nDDM=n.Dodecyl Mercaptan

SLS=Sodium Lauryl Sulfate (28% active)

QM.1458=Heteroalkyl methacrylate.

Polymers 1–4 all prepared by essentially the same process (except that for Polymer 1 only a single monomer emulsion was used while for the others two separate monomer emulsions were used—total feed time is the same for all four). A detailed description is presented for Polymer 1:

Polymer 1

A 5-liter round-bottom flask equipped with a paddle stirrer, thermocouple, nitrogen inlet, and reflux condenser was charged with a mixture of 1070 grams of hot deionized water, 3.0 grams of sodium persulfate, and 44 grams of a 100 nm latex seed with a solids content of 45%. A monomer emulsion consisting of 425 grams of deionized water, 23.5 grams of sodium dodecylbenzene sulfonate (23%), 1728 grams of styrene, 36 grams of divinyl benzene, and 36 grams of methacrylic acid was prepared. Gradual addition of this monomer emulsion was begun as well as gradual addition of 6 grams of sodium persulfate in 180 grams of deionized water. The reaction temperature was maintained at 85° C. during the 185 minute addition time for the monomer emulsion and sodium persulfate solution. After the gradual additions were complete a solution of 0.015 grams ferrous sulfate heptahydrate in 15 grams deionized water was added. A solution of 3.85 grams of tert-butylhydroperoxide (70%) in 80 grams deionized water and a solution 5.95 grams isoascorbic acid in 80 grams deionized water were added while the temperature was maintained at 85° C. Next, 207 grams of a dilute aqueous sodium hydroxide (1.7%) solution was added. The reaction mixture was cooled and the product filtered to remove any coagulum formed. The final latex had a solids content of 45.1%, a pH of 5.7, and a particle size of 348 nm (as measured using a Brookhaven BI-90 instrument).

TABLE 1

Monomer compositions (weights in grams) and properties for Polymers 1–4.

| | Polymer 1 | Polymer 2 | Polymer 3 | Polymer 4 |
|---|---|---|---|---|
| | First Monomer | | | |
| Emulsion | | | | |
| Water | 425 | 361 | 319 | 276 |
| Sodium dodecyl benzene sulfonate (23%) | 23.5 | 20 | 17.6 | 15.3 |
| Styrene | 1728 | 1469 | 1296 | 1123 |
| Divinylbenzene | 36 | 30.6 | 27 | 23.4 |
| Methacrylic acid | 36 | 30.6 | 27 | 23.4 |

TABLE 1-continued Monomer compositions (weights in grams) and properties for Polymers 1–4.

|  | Polymer 1 | Polymer 2 | Polymer 3 | Polymer 4 |
|---|---|---|---|---|
| Second Monomer Emulsion |  |  |  |  |
| Water | 64 | 106 | 149 |  |
| Sodium dodecyl benzene sulfonate (23%) | 3.5 | 5.9 | 8.2 |  |
| Butylacrylate | 264.6 | 441 | 617.4 |  |
| Methacrylic acid | 5.4 | 9 | 12.6 |  |
| Properties |  |  |  |  |
| Solids (%) | 45.1 | 45.3 | 45.4 | 45.0 |
| pH | 5.7 | 5.1 | 4.9 | 4.9 |
| PS (nm) | 348 | 425 | 378 | 414 |

Polymer 5—Preparation of Emulsion Polymer

A five liter flask was charged with 1461 g deionized water and heated to 87° C. while being swept with $N_2$. A monomer pre-emulsion was prepared from 493 g deionized water, 16.1 g SLS, 1350.0 g BA, 75.0 g MMA, 60.0 g MAA, 15.0 g QM.1458 and 8.6 g nDDM. 120.0 g SLS. 1.9 g ammonium bicarbonate and 3.74 g ammonium persulfate were added to the flask along with 165 g deionized water. The monomer pre-emulsion was then added over two hours at 85° C. Over the course of the reaction, 0.82 g ammonium persulfate dissolved in 115 g deionized water was also added to the flask in a separate stream. When the addition was complete, the flask was cooled and 2.24 g 70% aqueous t-butyl hydroperoxide, 1.12 g sodium formaldehyde sulfoxylate and a trace of iron sulfate hepta-hydrate were added in a total of 45 g deionized water. Rinses were added throughout the polymerization. The emulsion polymer had a solids content of 37.2% by weight, a particle size of 50 nm and a pH of 3.1.

Polymer 6—Preparation of Emulsion Polymer

A five liter flask was charged with 1461 g deionized water and heated to 87° C. while being swept with $N_2$. A monomer pre-emulsion was prepared from 493 g deionized water, 16.1 g SLS. 750.0 g BA. 660.0 g MMA and 90.0 g MAA. 2.0 g SLS. 1.9 g sodium carbonate and 3.74 g ammonium persulfate were added to the flask along with 165 g deionized water. The monomer pre-emulsion was then added over two hours at 85° C. Over the course of the reaction, 0.82 g ammonium persulfate dissolved in 115 g deionized water was also added to the flask in a separate stream. When the addition was complete, the flask was cooled and 2.24 g 70% aqueous t-butyl hydroperoxide, 1.12 g sodium formaldehyde sulfoxylate and a trace of iron sulfate hepta-hydrate were added in a total of 45 g deionized water. Rinses were added throughout the polymerization. The emulsion polymer had a solids content of 40.0% by weight, a particle size of 140 nm and a pH of 4.9.

Polymer 7—Preparation of Emulsion Polymer

A five liter flask was charged with 1700 g deionized water and heated to 87° C. while being swept with $N_2$. A monomer pre-emulsion was prepared from 493 g deionized water, 16.1 g SLS, 990.0 g EA, 420.0 g MMA and 90.0 g MAA. 2.0 g SLS, 1.9 g sodium carbonate and 3.74 g ammonium persulfate were added to the flask along with 165 g deionized water. The monomer pre-emulsion was then added over two hours at 85° C. Over the course of the reaction, 0.82 g ammonium persulfate dissolved in 115 g deionized water was also added to the flask in a separate stream. When the addition was complete, the flask was cooled and 2.24 g 70% aqueous t-butyl hydroperoxide, 1.12 g sodium formaldehyde sulfoxylate and a trace of iron sulfate hepta-hydrate were added in a total of 45 g deionized water. Rinses were added throughout the polymerization. The emulsion polymer had a solids content of 39.5% by weight, a particle size of 140 nm and a pH of 5.3.

Polymer 8—Preparation of Emulsion Polymer

A five liter flask was charged with 1500 g deionized water and heated to 87° C. while being swept with $N_2$. A monomer pre-emulsion was prepared from 493 g deionized water, 16.1 g SLS, 990.0 g EA, 490.5 g MMA and 19.5 g MAA. 37.5 g SLS and 3.74 g ammonium persulfate were added to the flask along with 120 g deionized water. The monomer pre-emulsion was then added over two hours at 85° C. Over the course of the reaction, 2.11 g ammonium persulfate dissolved in 115 g deionized water was also added to the flask in a separate stream. When the addition was complete, the flask was cooled and 2.24 g 70% aqueous t-butyl hydroperoxide, 1.12 g sodium formaldehyde sulfoxylate and a trace of iron sulfate hepta-hydrate were added in a total of 45 g deionized water. Rinses were added throughout the polymerization. The emulsion polymer had a solids content of 38.8% by weight, a particle size of 60 nm and a pH of 2.1.

Polymer 9—Preparation of Emulsion Polymer

A five liter flask was charged with 1461 g deionized water and heated to 87° C. while being swept with $N_2$. A monomer pre-emulsion was prepared from 493 g deionized water, 16.1 g SLS, 1050.0 g BA, 375.0 g MMA, 60 g MAA, 15.0 g QM.1458 and 8.6 nDDM. 120.0 g SLS, 1.9 ammonium bicarbonate and 3.74 g ammonium persulfate were added to the flask along with 165 g deionized water. The monomer pre-emulsion was then added over two hours at 85° C. Over the course of the reaction, 0.82 g ammonium persulfate dissolved in 115 g deionized water was also added to the flask in a separate stream. When the addition was complete, the flask was cooled and 2.24 g 70% aqueous t-butyl hydroperoxide, 1.12 g sodium formaldehyde sulfoxylate and a trace of iron sulfate hepta-hydrate were added in a total of 45 g deionized water. Rinses were added throughout the polymerization. The emulsion polymer had a solids content of 38.3% by weight, a particle size of 53 nm and a pH of 7.3.

Polymer 10 Preparation of a Large Dimension Emulsion Polymer

A 5 liter, four-necked flask equipped with a mechanical stirrer, nitrogen sparge, thermocouple and condenser was charged with 208 grams of water and 0.01 grams of Alipal CO.436. The kettle solution was heated at 85° C. To the kettle was then added 0.6 grams of butyl acrylate, 0.3 grams of methyl methacrylate, 0.3 grams of hydroxyethyl methacrylate, 0.8 grams of methacrylic acid, and 0.08 grams of n.dodecanethiol. Five minutes later, a kettle initiator, 0.4 grams of APS dissolved in 20 grams of water was added. Fifteen minutes later, a monomer emulsion containing 19.4 grams of butyl acrylate, 7.3 grams of methyl methacrylate, 7.3 grams of hydroxyethyl methacrylate, 23.2 grams of methacrylic acid, 2.52 grams of n.dodecanethiol, and 0.6 grams of Alipal CO.436 in 250 grams of water, and an initiator solution, 0.6 grams APS dissolved in 30 grams of water, were cofed over a period of one hour while the kettle temperature was maintained at 85° C. The kettle temperature was held at 85° C. for fifteen minutes after the end of the feeds.

To the above emulsion polymer was then added 45 grams of triethanolamine, 9.6 grams decanol, and a mixture of 10 grams of ferrous sulfate solution (0.1% active) and 10 grams of versene solution (1% active). Subsequently, three feed, one a monomer emulsion containing 300 grams of water, 6.5 grams of Conco AAS.60S (60% active), 200 grams of butyl acrylate, 300 grams of styrene, and 0.5 grams of n-dodecanethiol, the second an initiator, 1.5 grams of TBHP and 1.5 grams APS dissolved in 50 grams of water, and the third a reducing agent, 2 grams of sodium bisulfite dissolved in 50 grams of water co-fed into the kettle over a period of one hour while the kettle temperature was maintained at 85° C. Fifteen minutes after the end of the feed, the kettle was cooled to 63° C. A chaser couple, 1.0 grams of TBHP in 5 grams of water and 0.7 grams of Formopon in 10 grams of water were added thereafter. Fifteen minutes later, the polymer was cooled to ambient temperature. The resulting polymer had 35.5% of total solids and rod-shaped particles 1 microns in diameter, 20–60 microns in length.

| Latex Polymer parameters: | | |
|---|---|---|
| Polymer ID | Particle size (nm) | Tg (Calc Fox ° C.) |
| 1 | 348 | 100 |
| 2 | 425 | 100/–50 |
| 3 | 378 | 100/–50 |
| 4 | 414 | 100/–50 |
| 5 | 50 | –43 |
| 6 | 140 | 6 |
| 7 | 140 | 12 |
| 8 | 60 | 10 |
| 9 | 53 | –21 |
| 10 | NA | |

Example Preparation

Example 1
Use Polymer 1 as Supplied (Comparative Example)

Example 2
Use Polymer 2 as Supplied

Example 3
Use Polymer 3 as Supplied

Example 4
Use Polymer 4 as Supplied

Example 5
Blend Polymer 1 with Polymer 5 at a Ratio of 95/5 Polymer 1/Polymer 5 Based on Dry Polymer Volume Example 6
Blend Polymer 1 with Polymer 5 at a Ratio of 85/15 Polymer 1/Polymer 5 Based on Dry Polymer Volume Example 7
Blend Polymer 1 with Polymer 5 at a Ratio of 65/35 Polymer 1/Polymer 5 Based on Dry Polymer Volume Example 8
Blend Polymer 1 with Polymer 5 at a Ratio of 50/50 Polymer 1/Polymer 5 Based on Dry Polymer Volume Example 9
Blend Polymer 1 with Polymer 6 at a Ratio of 95/5 Polymer 1/Polymer 6 Based on Dry Polymer Volume Example 10
Blend Polymer 1 with Polymer 7 at a Ratio of 95/5 Polymer 1/Polymer 7 Based on Dry Polymer Volume Example 11
Blend Polymer 1 with Polymer 8 at a Ratio of 95/5 Polymer 1/Polymer 8 Based on Dry Polymer Volume Example 12
Blend Polymer 1 with Polymer 9 at a Ratio of 95/5 Polymer 1/Polymer 9 Based on Dry Polymer Volume Example 13
Polymer 10 as Supplied.
Test Methods The aqueous latex dispersion or latex dispersion blend was drawn down at 75 microns wet and allowed to dry at ambient temperature for 1 hour. A visual assessment for cracking was done as well as a finger abrasion test to determine if the film was friable. It is desirable for the film to have no cracks and not be friable. Film opacity was used to judge whether the film was porous. If the film dried to give an opaque film then it was deemed to be porous. At that point a few drops of Isopar™ L was placed on the film. If the film went from opaque to clear within a 10 minute time period, the film was deemed to have an open porous structure.

| | Results for Multiphase Polymers | | | |
|---|---|---|---|---|
| Example ID | Cracking | Friable | Opacity | Isopar L test |
| 1 (comparative) | Severe cracking | very friable | opaque | goes clear |
| 2 | no cracking | friable | opaque | goes clear |
| 3 | no cracking | not friable | opaque | goes clear |
| 4 | no cracking | not friable | opaque | goes clear |

The results show that without a soft film forming polymer phase the hard polymer forms a porous film, but is quite brittle and friable. By putting 35 to 15% by volume of a soft polymer on the hard polymer, the resulting film retains porosity and becomes non-friable.

| | Results for Polymer blends | | | |
|---|---|---|---|---|
| Example ID | Cracking | Friable | Opacity | Isopar L test |
| 1 (comparative) | Severe cracking | very friable | opaque | goes clear |
| 5 | no cracking | not friable | opaque | goes clear |
| 6 | no cracking | not friable | opaque | goes clear |
| 7 | no cracking | not friable | opaque | goes clear |
| 8 (comparative) | no cracking | not friable | translucent | stays opaque |

The results show that by blending between 5 and 35% of a soft/small film forming binder into the hard polymer the resulting film retains porosity and becomes non friable. At a level of 50% film forming binder the film losses its porosity. In a European publication, EP 0 288,203 B1, a process is disclosed wherein a 50:50 blend of a hard polymer latex and a soft polymer latex were used in conjunction with a flocculant to produce a porous film. The results of comparative Example 8 in the present application show that in the absence of a flocculant, a 50:50 blend of a hard polymer latex and a soft polymer latex does not form a porous film. The results show that it is possible to obtain porous films without the aid of a flocculant if the soft film forming binder is between 5% and 35% of the volume of the film. Further, the results of the invention are outside the result disclosed in EP 0 288,203 B1. The film of example 5 was placed in an 80° C. oven for 1 hour, after which the film retained opacity, and went clear with the Isopar L, thus indicating that the film retains porosity even at elevated temperature.

Results of polymer blends (different Tgs)

| Example ID | Cracking | Friable | Opacity | Isopar L test |
|---|---|---|---|---|
| 1 (comparative) | Severe cracking | very friable | opaque | goes clear |
| 5 | no cracking | not friable | opaque | goes clear |
| 9 | cracking | friable | opaque | goes clear |
| 10 | cracking | friable | opaque | goes clear |
| 11 | cracking | friable | opaque | goes clear |
| 12 | no cracking | not friable | opaque | goes clear |
| 13 | no cracking | not friable | opaque | goes clear |

The results of example 1, 5, and 9–12 how that polymer Tg and particle size are important for achieving a porous crack free and non friable film. Examples 9–11 all utilize a small film forming binder with a Tg above 0° C., and all of these crack. Whereas, examples 5 and 12 utilize a small (less than 20% of the large non film former) soft (less than 0° C.) film former. Examples 5 and 12 form porous films which are crack free and non friable. Additionally, Example 13 shows that a film cast from the large dimension emulsion polymer is porous and non-friable.

We claim:

1. A porous, non-friable polymer film having a network of pores or channels throughout comprising: a blend of (a) at least one squeous latex dispersion of polymer particles that are non-film forming; and (b) at least one aqueous latex dispersion of polymer particles that are film forming, wherein polymer particles of (b) have diameters small enough to fit into interstices formed between polymer particles of (a) and wherein the film forming polymer particles are present in the blend in an amount from between 5 and 35%, based on the total volume of (a) and (b).

2. The porous, non-friable polymer film according to claim 1, wherein the film forming polymer particles have a Tg not greater than 20 C. and the non-film forming polymer particles have a Tg of at least 30 C.

3. The porous, non-friable polymer film according to claim 1, wherein the non-film forming polymer particles are prepared from acrylic polymers.

4. The porous, non-friable polymer film according to claim 1, wherein the film forming latex polymer particles have particle diameters 20% or less in size than particle diameters of the non-film forming polymer particles.

5. The porous, non-friable polymer film according to claim 1, wherein the polymer film maintains porosity up to 160° C.

* * * * *